Figures 1, 2:
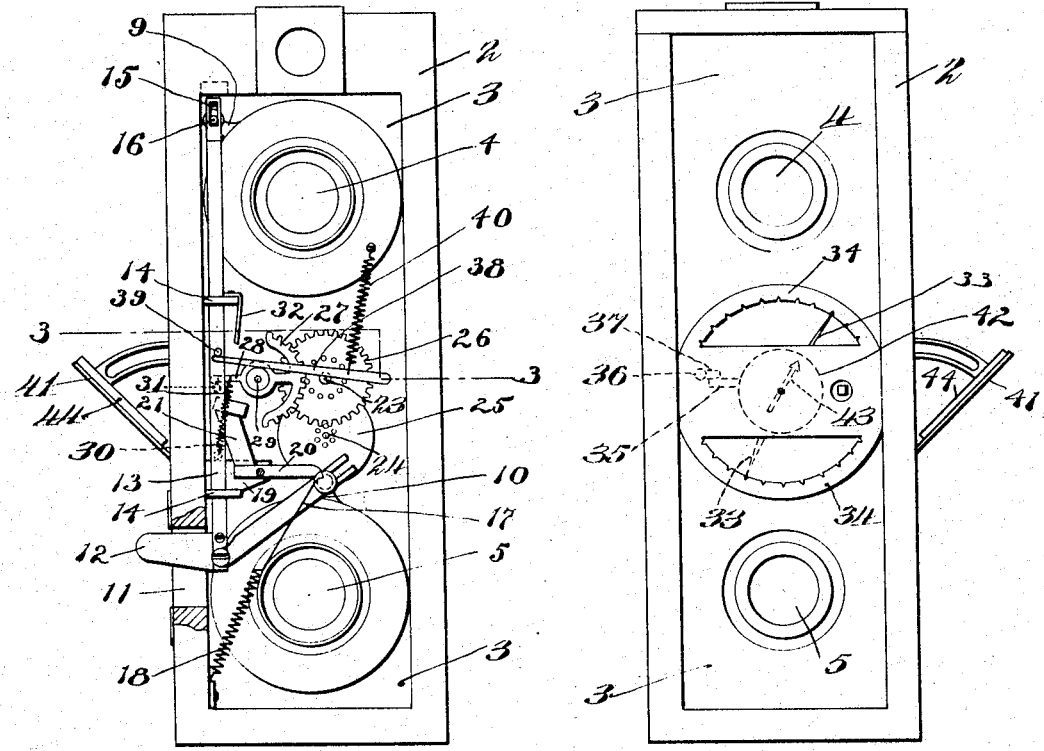

D. F. COMSTOCK & H. T. KALMUS.
SPEED MEASURING APPARATUS.
APPLICATION FILED AUG. 2, 1909.

1,136,105.

Patented Apr. 20, 1915.
2 SHEETS—SHEET 1.

Witnesses:
Warren G. Ogden
Edward S. Day

Inventors
D. F. Comstock & H. T. Kalmus
by Philip Van Everen Fish
Attorneys.

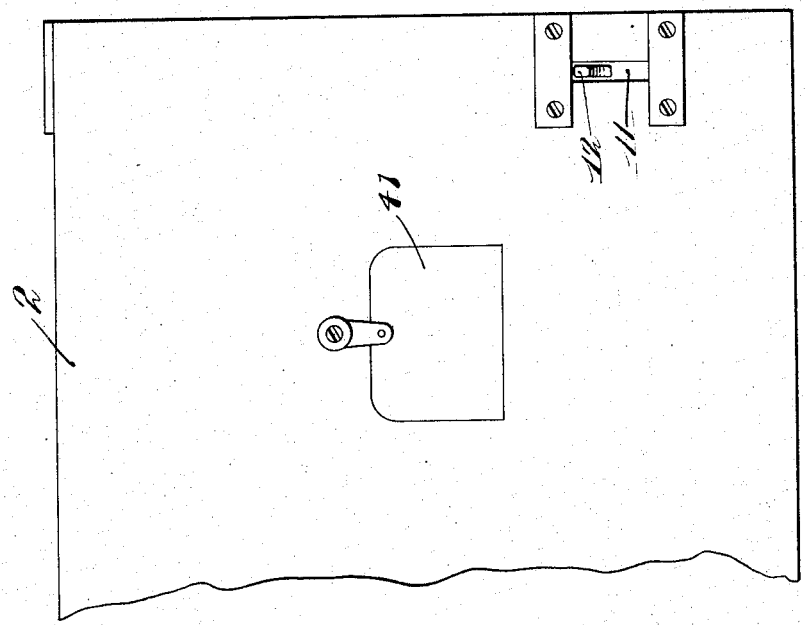
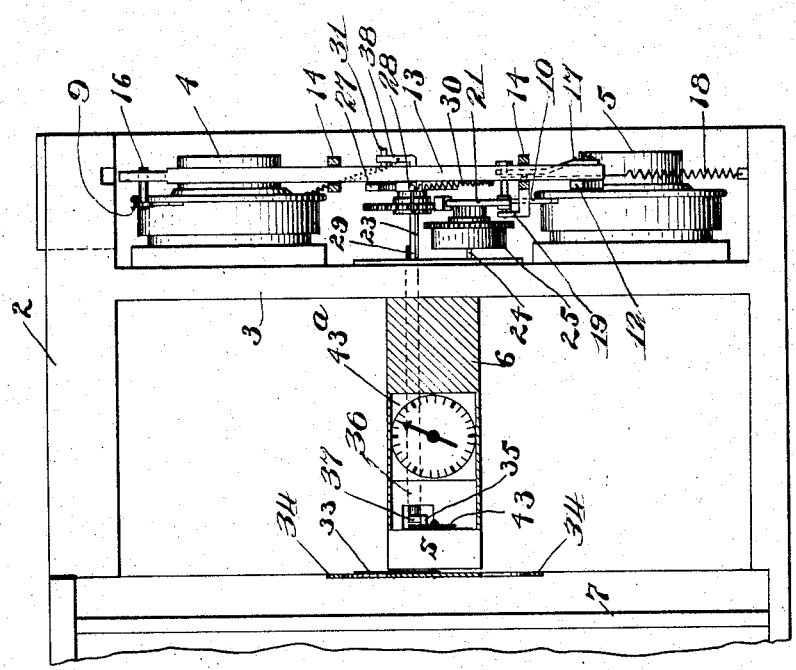

UNITED STATES PATENT OFFICE.

DANIEL F. COMSTOCK, OF BROOKLINE, AND HERBERT T. KALMUS, OF BOSTON, MASSACHUSETTS.

SPEED-MEASURING APPARATUS.

1,136,105.  Specification of Letters Patent.  Patented Apr. 20, 1915.

Application filed August 2, 1909. Serial No. 510,783.

*To all whom it may concern:*

Be it known that we, DANIEL F. COMSTOCK and HERBERT T. KALMUS, citizens of the United States, residing, respectively, at Brookline and Boston, in the counties of Norfolk and Suffolk and State of Massachusetts, have invented certain new and useful Improvements in Speed-Measuring Apparatus; and we do hereby declare the following to be a full, clear, and exact description of the invention, such as will enable others skilled in the art to which it appertains to make and use the same.

Our invention relates to speed measuring apparatus and more particularly to such apparatus for measuring the lineal speed of moving objects. In its preferred embodiment, the apparatus remains in a fixed position and the speed of the moving object is measured while the object is moving away or receding from the apparatus. The apparatus is, therefore, peculiarly adapted to measuring the speed of automobiles, and in this application our invention will be particularly described in connection with such use. It should be distinctly understood, however, that our invention, in the scope of its application, is not limited to this particular use, but, viewing it broadly, may be applied to many other uses, as will be readily recognized by those skilled in the art to which the invention appertains.

The embodiment of our invention herein illustrated and described is an improvement upon the speed measuring apparatus of our United States Patent No. 942,132 dated December 7, 1909. In determining the speed of an automobile with the apparatus of our said patent, two photographic negatives are made of the automobile as it retreats from the observer, who holds and operates the apparatus, and the time interval between the making of the two negatives is measured by a stop watch. The time interval is thereafter recorded from an observation of the stop watch, prints are made from the negatives, and the difference in the represented length of some part of the automobile, for instance, the wheel gage, which is ordinarily standard and therefore known, is measured from the pictures. Having obtained this data, and knowing the standard wheel gage and the focal length of the cameras with which the pictures were made, the distance traveled by the automobile during the interval of time between the taking of the two pictures can readily be determined mathematically.

One of the principal uses of the results obtained by means of our apparatus will be as evidence in contested cases in courts of law involving a violation of speed regulations when the apparatus has been operated by an officer of the law. It is desirable, therefore, to cause the apparatus to make a permanent record of the two positions assumed by the hand of the watch on the watch dial, so that errors in reading the watch will be eliminated. It is also desirable to construct the apparatus so that the operator can inspect the time measuring mechanism during the actual exposure of the plates in order to ascertain whether or not this mechanism is working.

One object of our present invention is to provide a combined photographic and time recording apparatus which may be employed to make two exposures, of two films or plates or of two parts of a single film or plate, in succession, and which also photographs, preferably upon the same negative, a representation of the time interval between the two exposures.

Another object of our present invention is to so arrange the time measuring mechanism within the apparatus that it may at the same instant of time be both photographed and its operation observed by the operator of the apparatus.

Other objects of our invention are to provide an apparatus of the character described which will be simple and compact in construction, positive in its operation and accurate in the results obtained.

In accordance with these objects one feature of our invention contemplates the provision, in a duplex photographic camera, that is, a camera adapted to take two pictures in succession, of a time recording mechanism located between the lenses and the plate, preferably immediately in front of the plate, so that when the plate is developed after exposure the representation of the time recording mechanism will be shown as an unexposed area. In the preferred embodiment of the invention the time recording mechanism comprises an annulus, representing the marginal portion of a watch dial, coöperating with which there is a delicate watch hand, extending to the annulus, rotated by suitable watch works within the annulus. With such a construction, when the plate is developed after exposure, in addition to bearing a representation of the objects outside the camera, it also bears a representation of the annulus referred to and the position of the watch hand relative thereto at the time each exposure was made.

In accordance with another feature of our invention the watch works are inclosed in a transverse light-tight casing between the lenses and in addition to the hand already referred to which is outside of this casing and moves in front of the plate, a second hand within the casing is provided, moving synchronously with the other hand, which, through the intervention of a series of mirrors is reflected to a point where it may be seen by the operator. It can thus be positively determined whether or not the time measuring mechanism is in operation at the instant of time that each of the exposures is made.

Further features of our invention relate to means for positively insuring a starting of the time measuring mechanism before the first exposure is made and for insuring a continuation of its operation until after the second exposure is made, to means for making two exposures, with an interval of time between them, under control of a single actuating device, and to means for perfecting the construction and mode of operation, of apparatus of this character.

The features of our invention heretofore referred to, including certain details of construction and combinations of parts, as will hereafter appear, will be further explained in the following description and then particularly pointed out in the appended claims.

The preferred embodiment of the invention is shown in the accompanying drawings, in which,—

Figure 3:
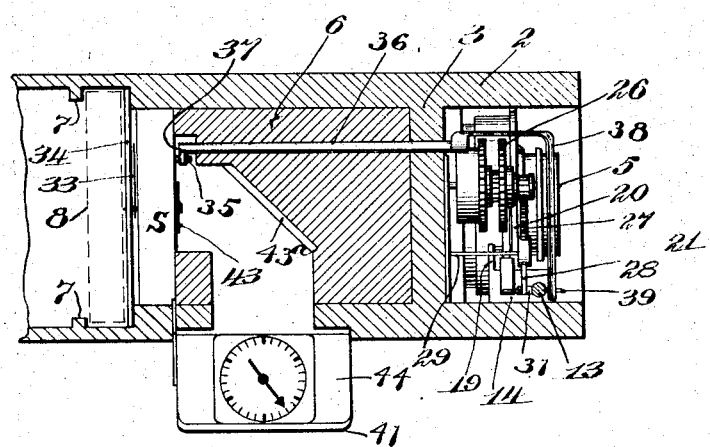

Figure 1 is an elevation of the mechanism at the front of the apparatus, the front cover plate being removed; Fig. 2 is an elevation looking into the apparatus from the rear, the rear cover plate being removed; Fig. 3 is a transverse section taken on the line 3—3 of Fig. 1; Fig. 4 is an elevation of the left hand side of the apparatus, viewing Fig. 1, with the side of the casing removed; and Fig. 5 is an elevation of the left hand side of the forward portion of the apparatus, viewing Fig. 1.

In the embodiment of the invention illustrated in the drawings, a casing 2 is provided which incloses a duplex photographic camera, that is, a camera which is adapted to take two pictures, preferably in succession. The casing is provided with a vertical partition 3 (Fig. 4) near its front end, in which are mounted two casings for lenses 4 and 5, which casings may be of any suitable and convenient construction. Extending rearwardly from the partition 3 is a centrally arranged, transverse partition 6 which divides the space in the rear of the partition 3 into two compartments. The partition 6 extends about half way toward the rear end of the casing 2, and at the rear of this partition there is provided a pair of vertical guides 7 (Figs. 3 and 4) in front of which there may be slipped a plate or film holder of usual construction. In the rear of the guides 7 there is provided an open space which is used as a storage space for extra plate holders, as is usual. When a plate holder is in position, as shown at 8 in dotted lines Fig. 3, it abuts against the rear end of the transverse partition 6, and the portions of the plate within the holder extend above and below said partition, thus forming the two plates on which pictures are taken through the lenses 4 and 5. Obviously it is immaterial whether a single plate be placed within the holder, extending the entire length of the holder, or whether the holder be made in two compartments and a plate of proper size placed in each compartment. Whether a single plate or two plates are used, two separate sensitized surfaces are provided respectively above and below the partition 6 for taking two separate pictures of the same object. Since there are the two sensitized surfaces, the separate pictures of the object can be taken in rapid succession without reloading the camera.

Referring now to Fig. 1, the lenses 4 and 5 are provided with the usual shutters, and each shutter is provided with a convenient form of escapement. A portion of the escapement of the shutter for the lens 4 is indicated at 9, and a portion of the escapement of the shutter for the lens 5 is indicated at 10. The casing of the camera at its left hand side is provided with an opening 11 through which there projects an actuating device 12 which is secured to the lower end of a slide bar 13, moving in suitable guides 14, projecting from the inner surface of the casing in front of the vertical partition 3. The slide bar 13 at its upper end is provided with a slot 15 within which there projects a pin 16 (Fig. 4) upon the portion 9 of the escapement of the shutter for the lens 4. Pivoted at the lower end of the slide bar 13 is a bar 17 provided with a forked end which embraces a pin projecting from the portion 10 of the escapement of the shutter for the lens 5. The escapement of this lens shutter is operated by means of a coiled spring 18 having one end connected to the escapement and its other end to the casing of the camera. A bracket 19 (Fig. 1) projecting from the inner face of the casing has pivoted thereon a lever 20 the inner end of which projects into a recess (see dotted lines in Fig. 1) formed in the portion 10 of the escapement of the shutter for the lens 5, and normally holds this shutter set, as shown in Fig. 1. The lever 20 is provided with an upwardly projecting arm 21 for a purpose to be presently referred to. Projecting from the forward face of the partition 3 are two arbors 23 and 24 (Fig. 4), the lower one 24 of which carries a weighted wheel 25. This wheel is connected by a suitable train of pinions and gear wheels 26 (Fig. 1) with a segment 27 upon one end of a lever 28 pivoted upon a third arbor 29 also projecting from the front face of the partition 3. The lever 28 is connected to the slide bar 13 by means of a coiled spring 30. The slide bar 13 is provided with a pin 31 (Fig. 3) which projects rearwardly to a point beneath the end of the lever 28. With this construction the shutters of both of the lenses 4 and 5 may be set by an upward movement of the slide bar 13, but upon a downward movement of said bar the shutters are released in succession, with the lapse of a measured time interval between their successive releases. This occurs in the following manner: Upon pressing upwardly upon the actuating device 12, the slide bar 13 is also moved upwardly within its guides and the lower end of the slot 15, at its upper end, engages the escapement 9 and sets the shutter for the lens 4 to which it is connected. Substantially simultaneously the forked end of the bar 17 engages the escapement 10 and moves it in a direction to set the shutter for the lens 5, at the same time elongating the spring 18. When the escapement 10 is set by the upward movement of the bar 17, the lever 20 drops by gravity into the recess in the portion 10 of the escapement of the shutter and holds the shutter set against the force of the spring 18. The upward movement of the slide bar 13 also causes the pin 31 to engage the lever 28 and move its outer end upward, incidentally rotating the weighted wheel 25, due to the angular movement of the segment 27. The shutters being set, the camera is now in readiness to take its two pictures. To take the pictures the actuating device 12 is depressed. With the construction just described, a depression of the actuating device 12 first removes the bar 17 from the escapement 10 so that it is free at the appointed time to be operated by its spring 18, and next engages the escapement 9 with the upper end of the slot 15, a continued downward movement of the operating device releasing the shutter for the lens 4 and causing exposure of the plate in the chamber above the transverse partition 6. The lowering of the slide bar 13 moves the pin 31, which has been supporting the lever 28, away from this lever and at the same time elongates the coiled spring 30. The tension of this spring immediately operates to draw the outer end of the lever 28 downward about its pivot 29, but this movement is a slow one owing to the inertia of the weighted wheel 25, which must be overcome. The wheel 25 and train of gears and pinions 26 therefore act as a retarding or time-consuming mechanism to delay the time of operation of the shutter for the lens 5. In a short time, in practice in about one second, the spring 30 has pulled the lever 28 downward a sufficient distance for it to engage with the upwardly projecting arm 21 of the lever 20, and, by pressure upon said arm, turn the lever in a direction to remove its inner end from the recess in the escapement 10. As soon as this occurs, the spring 18 operates to release the shutter for the lens 5. This mechanism therefore provides a single device by which both of the shutters for the two lenses of the duplex photographic camera may be set, and thereafter released in succession, but with a definite interval of time elapsing between the release of the two shutters. A leaf spring 32 (Fig. 1) is provided against which the upper end of the segment 27 abuts when the lever 28 is drawn downwardly by its spring 30, thus yieldingly stopping the rotation of the weighted wheel 25 under the action of said spring.

A light tight chamber S is formed at the rear end of and within the transverse partition 6, and a time measuring mechanism is located in this chamber. As the particular construction of this mechanism forms no part of our present invention, it need not be described further than to say that it is preferably of the stop watch type, but the mechanism is constructed to cause the moving hand of the watch to pass through a complete revolution over the watch dial after the hand is once started. In the present construction the moving hand or indicator 33 (Figs. 2 and 4) of the time measuring mechanism is mounted upon the usual central arbor which projects from the rear end of the transverse partition 6. The moving hand is of a sufficient length to extend into the chamber both above and below the partition as it is moved angularly by the watch works. Also secured to the rear of the partition is an annulus 34 which represents the dial of the watch and is divided into spaces representing 15th seconds (see Fig. 2). The stop watch is provided with the usual form of starting lever 35, a depression of the lever starting the watch, but, as heretofore stated, the watch stops automatically after the moving hand has completed a full revolution. In the present construction it is convenient for a full revolution to represent two seconds of time. Extending longitudinally of the camera through the partition 6 is a rock shaft 36 (Fig. 3) which is provided at its rear end with a crank 37 above and adapted to engage the starting lever 35 of the time measuring mechanism.

At its forward end the rock shaft is provided with a second crank 38, the end of which extends across the slide bar 13 (see Fig. 1). The crank 38 is held with its free end in engagement with the lower side of a pin 39 projecting from the slide bar 13 by means of a coiled spring 40 (Fig. 1) extending between the crank and a stationary part of the camera. This position of the crank 38 maintains the crank 37 out of contact with the starting lever 35 of the time measuring mechanism. With this construction, when the actuating lever 12 is depressed, as heretofore described, to release the two shutters and expose the plates within the camera, during the time that the pin 16 is traversing the slot 15 at the upper end of the slide bar, the pin 39 is bearing upon the crank 38 and has moved it downward a sufficient distance to cause the crank 37 at the rear end of the rock shaft 36 to engage and bear upon the starting lever 35 with sufficient force to start the watch works within the space S in operation. Thus the moving hand 33 of the time measuring mechanism is set in operation prior to the release of the shutter for the lens 4 of the upper camera which takes the first picture, because this lens is not released until the upper end of the slot 15 engages and bears upon the pin 16. By the time the shutter for the lower lens 5 is released the moving hand 33 of the time measuring mechanism has moved to a position on the lower portion of the annulus 34 as shown in dotted lines in Fig. 2, and is, therefore, within the space below the transverse partition 6, which forms the lower camera. When the plate is developed, a representation of the annulus 34 is shown on the negative as an unexposed area, as this annulus covers a portion of the plate at the time the pictures were being taken. There is also shown upon the plate, both above and below the blank space which indicates the depth of the transverse partition 6, lines or streaks showing the exact positions of the moving hand 33 of the stop watch at the instant of time that the upper picture was taken, and at the instant of time that the lower picture was taken. This must necessarily be so, because the ray of light which takes the picture is prevented from reaching that portion of the plate behind the moving hand, in whatever position that hand may be, and, therefore, when the plate is developed, this portion of the plate is shown as an unexposed area. As the notches which indicate intervals of time on the annulus 34 are plainly visible upon the negative, the amount of time elapsing between the taking of the two pictures can be readily measured by computing the distance between the two positions of the moving hand shown upon the negative. The negative, or the print taken therefrom, forms, therefore, a permanent record of the interval of time elapsing between the taking of the two pictures.

As the watch works and moving hand 33 are entirely hidden within the camera, it is impossible to determine from the time measuring mechanism itself whether or not it is in operation at the time the plate is exposed. In order to permit the operator to assure himself that the time measuring mechanism is in operation, an opening leading to the mechanism and closed by a door 41 (Fig. 5) is provided in the side of the camera casing. This opening extends (see Fig. 3) within the transverse partition 6 and to the front of the chamber S within which the watch works are located. On the front wall of this chamber there is provided a dial 42 (see dotted lines, Fig. 2) having a moving hand 43 (Fig. 4), and within the partition 6 opposite this dial there is provided a 45° mirror 43$^a$ which reflects the dial. The inner face of the door 41, which closes the opening in the casing of the camera, is also provided with a mirror 44 which receives the reflection of the dial from the mirror 43$^a$. When the door is open, the operator can, by looking down, see the reflection of the dial 42 in the mirror 44, and by an inspection of this reflection can determine whether or not the hand 43 is moving during the time that the plate within the camera is being exposed. The hand 43 is arranged to move synchronously with the hand 33, and therefore, if the operator sees that the hand in the reflection is in operation, he is certain that the hand which is moving across the front of the film or plate is in operation, and is being photographed.

In operation the operator, noting the approach of an automobile, the speed of which he desires to ascertain, allows it to pass him, and thereafter he presses the actuating device 12, which first sets the time measuring mechanism in operation, and thereafter exposes the plate within the camera, first through the lens 4, and after an interval of time has elapsed, through the lens 5. After the plate has been deevloped, either the negative, or print therefrom, is marked with the date, the time indicated by the two positions of the moving hand of the stop watch, and any other data which may seem desirable. The represented length of the wheel gages of the rear wheels of the automobile in the two pictures is then carefully measured and the distance traveled by the automobile is computed from the following formula:—

$$D = f\,G\,\frac{g-g'}{gg'}$$

in which D is the distance traveled by the automobile between the taking of the two pictures, $f$ the focal length of the cameras, G the wheel gage of the automobile, g the represented length of the wheel gage measured on the picture first taken, and g' the represented wheel gage measured on the picture last taken. Having ascertained the distance traveled by the automobile between the taking of the pictures and knowing the time interval, the speed is readily determined.

From the foregoing description it will be seen that the entire apparatus is self-contained, that is, the picture taking and time recording mechanisms are organized complete in one device. In the preferred form of the invention a single casing, for convenience and portability, incloses both the photographic and chronometric apparatus. The illustrated embodiment of the invention is thus particularly suited to the uses referred to more specifically herein.

As we believe all of the mechanism heretofore described and hereinafter claimed to be broadly new, nothing herein contained is to be interpreted as limiting our invention in the scope of its application to use in connection with the particular machine or the particular mode of operation, or both, herein illustrated and described.

While the particulars of construction herein set forth are well suited to one mechanical form of the invention, it is not to be understood that these particulars are essential since they may be variously modified within the skill of the artisan without departing from the true scope of the actual invention as defined in the following claims.

What is claimed as new is:—

1. An apparatus for determining the speed of a moving object having, in combination, photographic apparatus having light receiving apertures and a sensitized surface for taking two separate pictures of the moving object in rapid succession, and chronometric apparatus mounted with the photographic apparatus between the apertures and the sentitized surface and operating in connection with the photographic apparatus to permanently record the elapsed time between taking the pictures, substantially as described.

2. An apparatus for determining the speed of a moving object, having, in combination, two sensitized surfaces, means having light receiving apertures for successively exposing the two surfaces to take separate and successive pictures of the moving object, and chronometric apparatus between the apertures and the sensitized surface for causing a permanent record to be made of the time at which the exposures were taken, substantially as described.

3. An apparatus of the character described, having, in combination, a camera for taking two separate pictures in succession, and a time measuring mechanism having an indicator located within the camera and in front of the film or plate whereby an exposure of the film or plate causes a representation of said indicator as it appears at the time of the exposure to be formed on said film or plate, substantially as described.

4. An apparatus of the character described, having, in combination, a camera for taking two separate pictures, watch works within the camera, and a hand controlled by the watch works moving in front of the film or plate whereby the positions of the hand corresponding to the time of the exposures will be denoted on the negatives by unexposed areas, substantially as described.

5. An apparatus of the character described, having, in combination, two separate camera mechanisms, a single actuating device controlling both of the shutters, a time interval measuring device having a dial and single recording hand, and arranged to cause the camera mechanism to record the position of the hand on its dial at the instants of time pictures are taken by each of the cameras, substantially as described.

6. An apparatus for measuring the speed of a moving object, having, in combination, means having light receiving apertures and provision for taking succesive pictures of any moving object on a sensitized surface, and chronometric means in proximity to the picture taking means and between the apertures and the sensitized surface for causing the picture taking means to record the relative time at which each picture is taken, substantially as described.

7. An apparatus of the character described, having, in combination, means for taking successive pictures of any moving object comprising a duplex photographic camera, a single actuating device for causing the release of both of the shutters, and mechanism for causing an interval of time to elapse between the release of the shutters, and means mounted with the picture taking means for causing the picture taking means to record the relative time at which each shutter is released, substantially as described.

8. An apparatus of the character described, having, in combination, means for taking successive pictures of any moving object comprising a duplex photographic camera, a single actuating device for setting and releasing the shutters, and mechanism controlled by a movement of said device for causing an interval of time to elapse between the release of the shutters, and means mounted with the picture taking means for causing the picture taking means to record the length of said time interval, substantially as described.

9. An apparatus of the character described, having, in combination, a duplex photographic camera, a stop watch within the camera, a single actuating device, and connections therefrom to start the stop watch and thereafter cause the camera to take two pictures in succession, substantially as described.

10. An apparatus of the character described, having, in combination, a duplex photographic camera, a stop watch having a moving hand within the camera, and means to start the stop watch and thereafter take two pictures in succession and with the taking of each picture simultaneously record the position of the hand of the stop watch, substantially as described.

11. An apparatus of the character described, having, in combination, a duplex photographic camera, a device for setting both shutters and for releasing one, a retarding or time consuming mechanism coöperating with said device for releasing the other shutter, and provision controlled by said device for measuring the elapsed time between the relase of the two shutters, substantially as described.

12. An apparatus for determining the speed of a moving object, having, in combination, a casing, means within the casing for taking two pictures of the moving object in succession, a time measuring mechanism operatively connected with the picture taking means for recording the time after the taking of the first picture at which the second picture is taken, said apparatus having provision permitting the operator to observe the operation of the time measuring mechanism while taking the pictures, substantially as described.

13. An apparatus for determining the speed of a moving object, having, in combination, means for taking two pictures of the moving object in succession, mechanism for measuring the time interval between the taking of the pictures so arranged within the apparatus as to cause the picture taking means to record the relative time at which each picture is taken, and mirrors for reflecting said mechanism to a point where its operation can be observed by the operator, substantially as described.

14. An apparatus for determining the speed of a moving object, having, in combination, a duplex camera for taking two pictures of the moving object in succession, mechanism for measuring the time interval between the taking of the pictures so arranged within the camera as to cause the picture taking means to record the relative time at which each picture is taken, a door in the camera casing having a reflecting inner surface and provision for projecting a reflection of said mechanism onto said surface, whereby when the door is open, the operation of said mechanism may be observed, substantially as described.

15. An apparatus for determining the speed of a moving object, having, in combination, a duplex photographic camera, having means provided with light receiving apertures for taking two pictures of the moving object in succession on sensitized surfaces comprising a manually operated device for releasing one shutter and automatic means located between the apertures and the sensitized surfaces controlled by said device for releasing the other shutter and for causing a measured time interval to elapse between the taking of the pictures, substantially as described.

16. An apparatus for measuring the speed of a moving object, having, in combination, a time measuring mechanism having an indicator, and picture taking means mounted with the time measuring mechanism and comprising a camera having a focusing lens and a sensitized surface for taking successive pictures of the moving object and for recording the position of said indicator at the time each picture is taken, said indicator being located between the lens and the sensitized surface, substantially as described.

17. An apparatus for measuring the speed of a moving object, having, in combination, means for taking successive pictures of the moving object comprising a camera having a focusing lens and a sensitized surface, and means between the lens and the sensitized surface for causing said picture taking means to record the relative time at which each picture is taken, substantially as described.

In testimony whereof we affix our signatures, in presence of two witnesses.

DANIEL F. COMSTOCK.
HERBERT T. KALMUS.

Witnesses to the signature of Daniel F. Comstock:
HORACE VAN EVEREN,
ALICE ACKROYD.

Witnesses to the signature of Herbert T. Kalmus:
ROLAND E. CLARK,
CHAS. A. LYONS.